April 26, 1949.                 H. VUORI                    2,468,579
              EXTENSIBLE LOAD-SUPPORTING MEANS FOR TRUCKS
                           Filed May 5, 1947

Inventor:
Hans Vuori
By Alex. E. MacRae
   Attorney.

Patented Apr. 26, 1949

2,468,579

UNITED STATES PATENT OFFICE 2,468,579

EXTENSIBLE LOAD-SUPPORTING MEANS FOR TRUCKS

Hans Vuori, Sudbury, Ontario, Canada

Application May 5, 1947, Serial No. 745,947
In Canada April 21, 1947

3 Claims. (Cl. 296—26)

This invention relates to an extensible bumper for vehicles and more particularly to a bumper of such type adapted to serve as a load-supporting member.

An object of the invention is to provide an extensible rear bumper for vehicles, such as trucks, wherein the top surface of the bumper may be placed in a plane which substantially registers with the plane of the load-supporting surface of the truck body, to serve as a load-carrying member in association with such load-supporting surface.

Other objects, advantages and details of the invention will become evident as the description proceeds with particular reference to the accompanying drawing, in which, Figure 1 is a partial side elevation of a truck embodying the invention.

Figure 1:
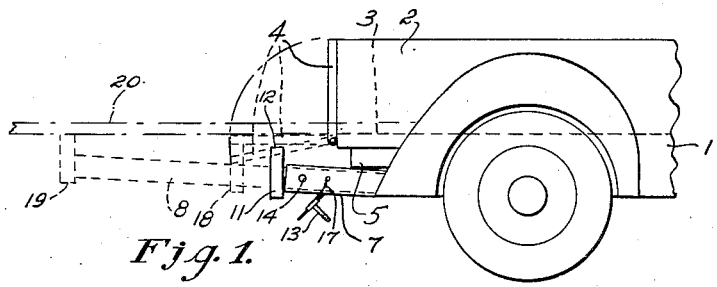
Figure 2:
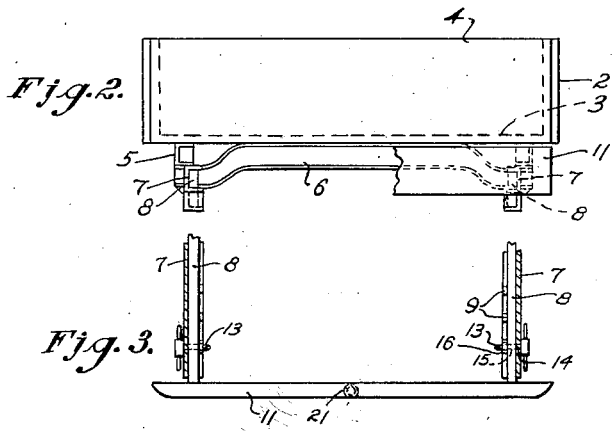
Figure 2 is a partial rear elevation of the truck body and bumper attachment.
Figure 3:
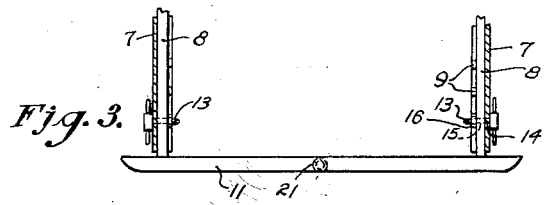
Figure 3 is a plan view of the bumper attachment.
Figure 4:
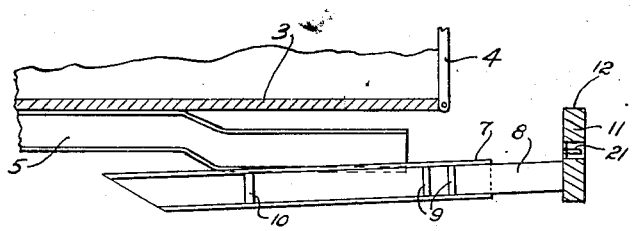
Figure 4 is a somewhat enlarged side elevation, in section, of the bumper attachment, with associated truck body parts.

In the drawing, 1 is a truck having a load-receiving box 2, the floor or load-carrying surface of which is indicated at 3. The box 2 may have a rear drop door 4. Body frame members are indicated at 5 and 6.

In accordance with the invention, a pair of rails or channel members 7 are mounted on one or both of the frame members 5 and 6 by welding or the like. The channels 7 extend longitudinally of the truck body beneath the box 2 and adjacent the sides thereof. The rearward ends of the channels may extend slightly beyond the rear end of the box, as shown. The channels are preferably slightly inclined in their longitudinal direction whereby their rearward ends are somewhat elevated with respect to the forward ends.

Slidingly mounted in the channels are respective bars 8. A plurality of strips 9 extending across the open side of each channel and fixed to the upper end lower flanges thereof may be provided to maintain the bars in position in the channels. The strips 9 are located adjacent the rearward end of each channel, and the innermost strip constitutes a stop member cooperating with a stop 10 on the forward end of each bar 8 to limit the rearward sliding movement of the bars.

A transverse bumper or load-supporting member 11 is fixed to the outer ends of the bars 8. The member 11 extends upwardly of the bars and has an upper load-supporting or engaging surface 12 which lies in a plane closely approximating the generally horizontal plane of the main load-carrying surface 3 of the truck.

Means for locking the bumper in its normal unextended position may comprise bolts 13 adapted to extend through holes 14 in the channels and registering holes 15 in the bars, and securing nuts 16. Each bolt 13 may be connected to its respective channel by means of a chain 17 whereby it is conveniently accessible for use.

A ring or hook 21 may be mounted on the member 11, and preferably recessed therein, to serve as a connection fitting for trailers and the like.

Referring to Figure 1, it will be observed that, when the member 11 is in its normal unextended position, its upper surface 12 lies in a plane slightly below the plane of surface 3 of the truck but that, by reason of the inclined mounting of the channels 7 and bars 8, rearward movement of the bars and member 11 will be in a slightly upward direction whereby the surface 12 will gradually rise during such rearward movement. When the member 11 is withdrawn to the position indicated in dotted lines at 18 and door 4 dropped into engagement therewith, the inner surface of the door will form a continuation of the surface 3 in substantially the same horizontal plane. Thus an extended load-carrying surface is provided for conveyance of materials the length of which is too great to be accommodated within the box. When the member 11 is withdrawn beyond the position 18, the door 4 may be dropped down into engagement with the bars 8, which constitute a support therefor, and the surface 12 may form a direct load-bearing surface for various lengths of materials to be conveyed. In the fully withdrawn position of member 11, as indicated in dotted lines at 19, the surface 12 thereof lies in substantially the same horizontal plane as surface 3 and constitutes an effective support for long pieces of material such as indicated at 20.

There has thus been provided a means for greatly increasing the type and variety of materials which may be conveyed by trucks particularly those of light and box body types. For instance, the transportation of lumber is normally quite impracticable with ordinary box body trucks since the pieces of lumber are frequently longer than the box, and, with the drop door open, no means are provided for effectively supporting either the door itself or the outer ends of the lumber pieces. The present invention makes possible the convenient transportation of lumber and like materials in ordinary box body and similar trucks.

I claim:

1. In a truck having a body frame member and a platform thereon, said platform having a load-engageable surface extending in a substantially horizontal plane, extensible auxiliary load supporting means comprising a pair of rails carried by the frame member and extending longitudinally of the truck and in slightly inclined relation to said platform surface with their rearward ends in elevated relation to their forward ends, a pair of bars slidingly mounted on said rails in longitudinal alignment therewith and entirely supported thereby, and a transversely extending member carried by the bars rearwardly of the platform and having an upper load supporting surface lying in a plane above the upper surfaces of said bars and rails, said transverse member being outwardly slidable with said bars to place its said load-supporting surface in substantially the same plane as that of said load-engageable surface of the platform.

2. In a truck having a body frame, and a box body thereon having a floor and a rear drop door, extensible auxiliary load-supporting means comprising a pair of rails fixed to the frame and extending longitudinally of the truck in slightly inclined relation to said floor with their rearward ends in elevated relation to their forward ends, a pair of bars slidingly mounted on the rails in longitudinal alignment therewith and entirely supported thereby, a transverse member fixed to the ends of the bars and having an upper load-supporting surface lying in a plane above the upper surfaces of said bars and rails, said door being engageable with said surface in one position of said member for support thereby in a substantially horizontal position, said member being outwardly slidable beyond said one position to a position wherein said surface lies in substantially the same plane as that of the upper surface of said floor, said door, in the latter position of the member, being engageable with said bars for support thereby.

3. In a truck having a body frame member and a platform thereon, said platform having a load-engageable surface extending in a substantially horizontal plane, extensible auxiliary load-supporting means comprising a pair of rails carried by the frame member in downwardly spaced relation to said platform and extending longitudinally of the truck, a pair of bars slidingly mounted on said rails in longitudinal alignment therewith and entirely supported thereby, a transversely extending member fixed to the ends of the bars rearwardly of the platform and having an upper load-supporting surface lying in a plane above the upper surfaces of said bars and rails, said transverse member being slidable with said bars and lying in at least one position thereof in substantially the same plane as that of the upper load-engageable surface of the platform, and means for locking said bars to the rails in a plurality of positions relative thereto.

HANS VUORI.

REFERENCES CITED

The following references are of record in the file of this patent:

UNITED STATES PATENTS

| Number | Name | Date |
|---|---|---|
| 1,272,620 | Carlson | July 16, 1918 |
| 1,361,603 | Milks | Dec. 7, 1920 |
| 1,366,771 | Devencenzi | Jan. 25, 1921 |
| 1,528,617 | Klotz | Mar. 3, 1925 |
| 2,197,401 | Weber | Apr. 16, 1940 |
| 2,350,050 | Lim | May 30, 1944 |